United States Patent
Koesema, Jr.

(10) Patent No.: US 7,926,777 B2
(45) Date of Patent: Apr. 19, 2011

(54) APPARATUS FOR AFFIXING DECORATIONS TO HOMES

(76) Inventor: John B. Koesema, Jr., Tampa, FL (US)

(*) Notice: Subject to any disclaimer, the term of this patent is extended or adjusted under 35 U.S.C. 154(b) by 0 days.

(21) Appl. No.: 11/838,424

(22) Filed: Aug. 14, 2007

(65) Prior Publication Data

US 2009/0045310 A1 Feb. 19, 2009

(51) Int. Cl.
*A47G 1/10* (2006.01)
*F21V 21/00* (2006.01)

(52) U.S. Cl. .............. 248/316.7; 248/229.2; 248/74.2; 52/28; 24/336; 362/396; 362/391

(58) Field of Classification Search .............. 248/316.7, 248/229.2, 229.26, 227.1, 230.7, 231.81, 248/74.2; 362/396, 249; 24/335, 336, 3.12, 24/11 R; 52/28
See application file for complete search history.

(56) References Cited

U.S. PATENT DOCUMENTS

| | | | |
|---|---|---|---|
| 2,826,387 A | 3/1858 | Rutten | |
| 788,335 A * | 4/1905 | Shepard | 24/347 |
| 1,614,719 A | 1/1927 | Dabney | |
| 2,332,855 A * | 10/1943 | Jones | 248/68.1 |
| D156,659 S * | 12/1949 | Reed | D8/395 |
| 2,565,636 A | 8/1951 | Tinnerman | |
| 3,193,229 A * | 7/1965 | Stock | 248/74.2 |
| 3,275,818 A | 9/1966 | Campbell | |
| 3,802,032 A | 4/1974 | Weed | |
| 3,883,926 A | 5/1975 | Reynolds | |
| D281,575 S * | 12/1985 | Chap | D8/363 |
| 4,974,128 A * | 11/1990 | Prickett | 362/145 |
| D375,453 S * | 11/1996 | Fleck | D8/395 |
| 5,573,167 A * | 11/1996 | Bebb et al. | 224/666 |
| 5,581,956 A * | 12/1996 | Fennessy et al. | 52/28 |
| 5,619,774 A * | 4/1997 | Perry | 24/3.6 |
| 5,707,136 A * | 1/1998 | Byers | 362/145 |
| 5,829,103 A * | 11/1998 | Allen | 24/11 R |
| 5,915,848 A * | 6/1999 | Deason | 4/496 |
| 6,338,460 B1 * | 1/2002 | Rumpel | 248/229.16 |
| D545,183 S * | 6/2007 | French et al. | D8/394 |
| 7,249,866 B1 * | 7/2007 | Tai | 362/249.01 |

* cited by examiner

*Primary Examiner* — Anita M King
(74) *Attorney, Agent, or Firm* — Larson & Larson, P.A.; Frank Liebenow; Justin Miller

(57) ABSTRACT

An application for a decoration clip includes a portion for inserting between a facial board of a roof and a drip guard and a portion for interfacing with an outer surface of the drip guard. The substantially flat insertion surface is connected to the substantially flat outlay surface, thereby forming an elongated U-shape when viewed from a side. A device for holding the decoration is situated on an outer surface of the portion for interfacing with an outer surface of the drip guard.

6 Claims, 3 Drawing Sheets

APPARATUS FOR AFFIXING DECORATIONS TO HOMES

FIELD OF THE INVENTION

This invention relates to the field of decoration and more particularly to a device for affixing decorations to the eaves of homes.

BACKGROUND OF THE INVENTION

It is well known that many enjoy holiday decorations temporarily mounted to the outsides of their homes. There are many ways known to accomplish such. For example, nails, screws or hooks can be installed for hanging such decorations at desired locations. Unfortunately, the nails, screws or hooks leave holes when removed or, if left in, often corrode or rust, often staining the surface of the home. Other forms of hooks offer stick-on clips, but can peel off paint when removed.

U.S. Pat. No. 3,275,818 to Campbell describes a display means for attaching holiday lights around a window. The described means includes an adjustable frame that fits within a window frame and accepts clips that hold the wires of the lighting system. This patent does not disclose a clip that attaches to the drip guard or flashing of a roofing system for holding decorations such as holiday lights.

U.S. Pat. No. 3,883,926 to Reynolds describes a hanger clamp that holds a light (such as a holiday ornament) to an exposed beam. The hanger has a hole through which a lamp is inserted. The disclosed device does not attach to the drip guard and, instead of holding strands of a holiday decoration, holds light bulbs, making it less useful for decorations such as garland and icicle lights.

None of the prior inventions propose a clip that attaches to the drip guard found on many roofing systems.

What is needed is a clip that will removably attach to a drip guard and provide a hook for holding decorations.

SUMMARY OF THE INVENTION

In one embodiment, a decoration clip is disclosed including a substantially flat insertion sheet for inserting between a facial board of a roof and a drip guard; and a substantially flat outlay sheet for interfacing with an outer surface of the drip guard. The substantially flat insertion surface is connected to the substantially flat outlay surface, thereby forming an elongated U-shape when viewed from a side of the decoration clip. A hook is placed an outer surface of the substantially flat outlay sheet for holding the decoration.

In another embodiment, a decoration clip is disclosed including a portion for inserting between a facial board of a roof and a drip guard; and a portion for interfacing with an outer surface of the drip guard. The substantially flat insertion surface is connected to the substantially flat outlay surface, thereby forming an elongated U-shape when viewed from a side. A device for holding the decoration is situated on an outer surface of the portion for interfacing with an outer surface of the drip guard.

In another embodiment, a U-shaped clip is disclosed including a substantially flat insertion side for inserting between a facial board of a roof and a drip guard, a substantially flat outer side for interfacing with an outer surface of the drip guard and a curved end interfacing the substantially flat insertion side to the substantially flat outer side. A hook is on an outer surface of the substantially flat outer side for holding a decoration.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
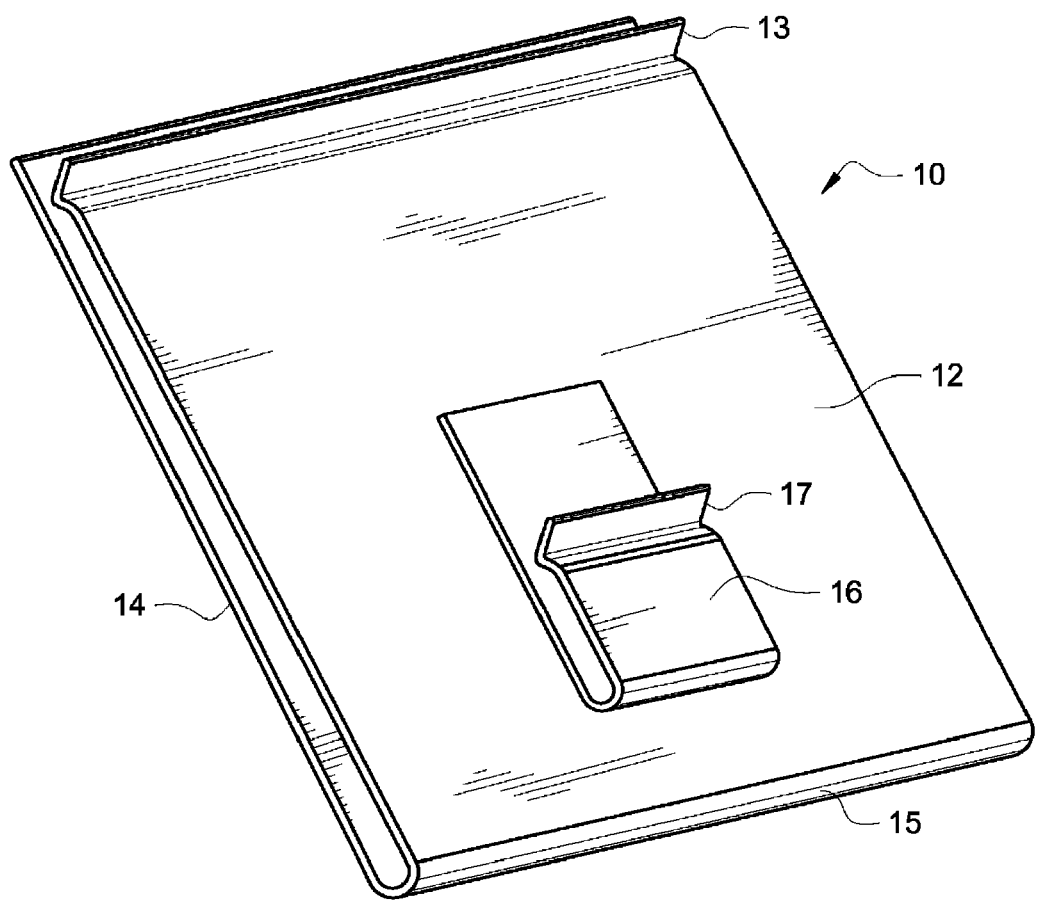
FIG. 1 illustrates a perspective view of a clip of the present invention.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a perspective view of a clip of the present invention will be described. The clip 10 is formed or cut into a substantially elongated U-shape having a relatively flat insertion sheet 14 for fitting between a rain guard (or flashing) and the facial board of a roofing system. The insertion sheet is connected to an outlay sheet 12 by a connecting sheet 15, thereby forming the substantially elongated U-shape. It is preferred that the insertion sheet 14 be held substantially close to the outlay sheet 12 by spring force of the material used, although this is not required. In embodiments without such spring force, the insertion sheet 14 is held in place by friction of the tight fit between the facial board surface and the drip guard (or flashing). A clip 16 is cut and bent, molded or affixed to the outer surface of the outlay sheet 12. Although shown in one position upon the outlay sheet 12, in alternate embodiments, the clip is fabricated in other locations on the outlay sheet 12. In some embodiments, a lip 13 is formed on the top surface of the outlay sheet 12 for assisting with insertion of the clip 10, similar to the insertion of a pen into a pocket protector. Likewise, in some embodiments, a lip 17 is formed in the upper edge of the clip 16 to assist with the insertion of the decoration (light strand, garland, etc).

In one embodiment, the clip 10 is made from sheet metal such as aluminum and bent into the substantially elongated U-shape. In this embodiment, it is preferred that the hook 16 is formed by cutting a substantially rectangular section from the outlay sheet 12 and bending such into the shape of the hook 16. Alternately, the hook 16 is fabricated separately and affixed to the outlay sheet by means known in the industry such as welding or with adhesives. In another embodiment, the clip 10 is molded, comprising a stiff plastic. In this embodiment, it is preferred that the hook 16 is molded as an integral part of the clip 10. Alternately, the hook 16 is molded separately and affixed to the outlay sheet by means known in the industry such as welding or with adhesives.

Figure 2:
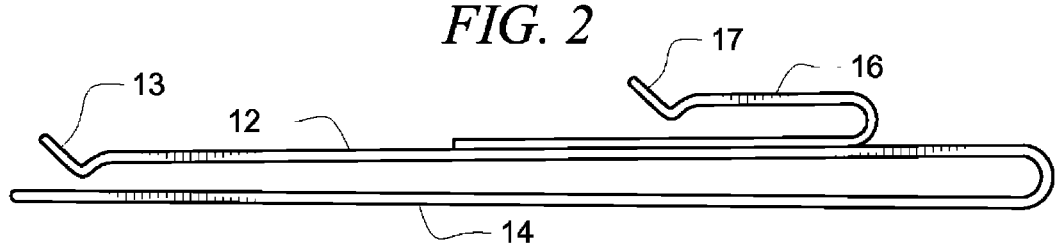
FIG. 2 illustrates a side plan view of a clip of the present invention.

Referring to FIG. 2, a side plan view of a clip of the present invention will be described. As previously described, the clip 10 is formed or cut into a substantially elongated U-shape having a relatively flat insertion sheet 14 for fitting between a rain guard (or flashing) and the facial board of a roofing system. The insertion sheet is connected to an outlay sheet 12 by a connecting sheet 15, thereby forming the substantially elongated U-shape. It is preferred that the insertion sheet 14 be held to the outlay sheet 12 by spring force of the material used, although this is not required. In embodiments without such spring force, the insertion sheet 14 is held in place by friction of the tight fit between the facial board surface and the drip guard (or flashing). A clip 16 is cut and bent, molded or affixed to the outer surface of the outlay sheet 12. Although shown in one position upon the outlay sheet 12, in alternate embodiments, the clip is fabricated in other locations on the outlay sheet 12. In some embodiments, a lip 13 is formed on the top surface of the outlay sheet 12 for assisting with insertion of the clip 10, similar to the insertion of a pen into a pocket protector. Likewise, in some embodiments, a lip 17 is formed in the upper edge of the clip 16 to assist with the insertion of the decoration (light strand, garland, etc).

Figure 3:
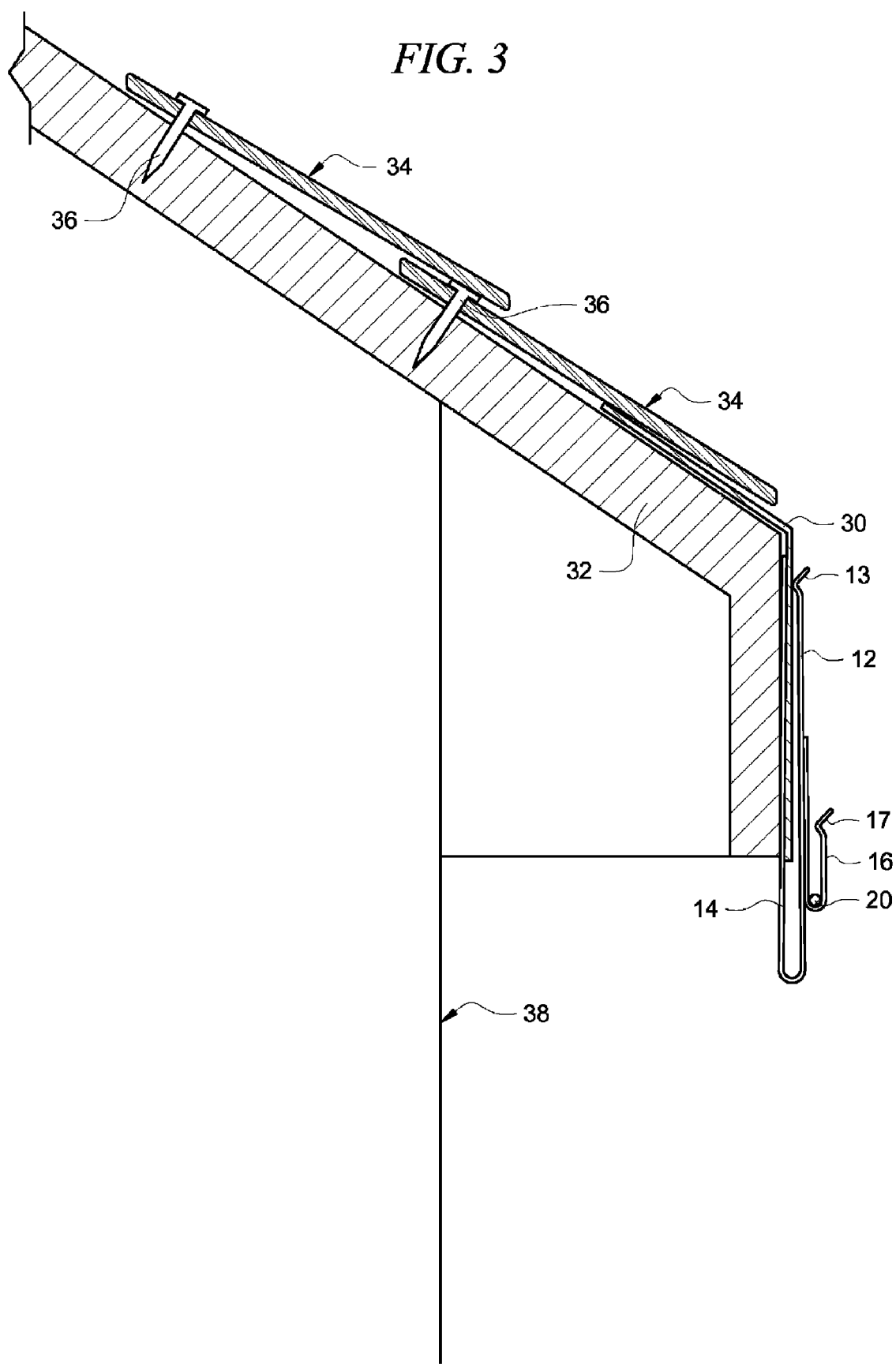
FIG. 3 illustrates a side plan view of a clip of the present invention installed on a drip guard.

Referring to FIG. 3, a side plan view of a clip of the present invention installed on a drip guard will be described. The relatively flat insertion sheet 14 of the clip 10 is fitted between a rain guard (or flashing) 30 and the facial board of a roofing system 32. The insertion sheet 14 is connected to an outlay sheet 12 by a connecting sheet 15, thereby forming the substantially elongated U-shape. In one embodiment, the clip is held in place by spring force between the insertion sheet 14 and the outlay sheet 12, although this is not required. In alternate embodiments without such spring force, the insertion sheet 14 of the clip 10 is held in place by friction of the tight fit between the facial board surface and the drip guard (or flashing). A decoration string or wire 20 is shown in the clip 16. For completeness, roofing material (shingles, etc.) 34 are nailed into the roof 32 with nails 36 and the side surface of the home 38 is shown.

Figure 4:
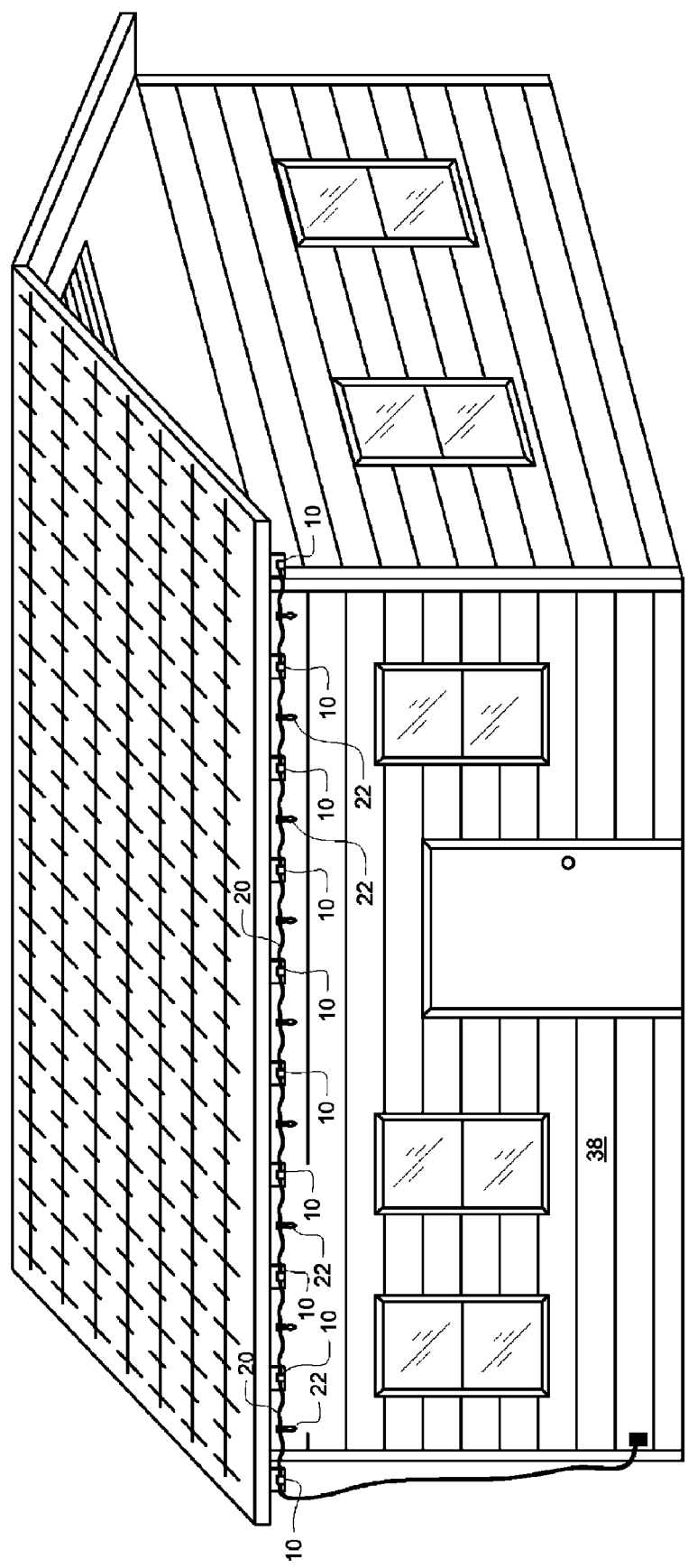
FIG. 4 illustrates an elevation view of a home showing multiple clips of the present invention.

Referring to FIG. 4, an elevation view of a home showing multiple clips of the present invention will be described. In this example, the decoration is a string of lights 20 with multiple light bulbs 22. The wire portion of the string of lights 20 is supported by multiple clips 10.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A decoration clip removably attached to a roofing system, the roofing system having a drip guard and a facial board, the decoration clip comprising:
    a planar and flat insertion sheet, the insertion sheet inserted between the facial board of a roof and the drip guard, the insertion sheet held in place between the facial board of the roof and the drip guard solely by a force of friction between the facial board, the drip guard and the insertion sheet, without the use of resilient members;
    a substantially planar and flat outlay sheet, the substantially flat outlay sheet interfaced with an outer surface of the drip guard;
    an arced connecting sheet, connecting the insertion sheet to the outlay sheet, thereby forming an elongated U-shape when viewed from a side of the decoration clip; and
    a clip on an outer surface of the outlay sheet, the clip forming a U-shape and the clip for holding one or more strands of decorations.

2. The decoration clip of claim 1, further comprising a lip on the clip, the lip situated on an edge of the clip distal from where the clip meets the outer surface of the outlay sheet.

3. The decoration clip of claim 1, further comprising a clip lip on the outlay sheet, the clip lip situated on an edge of the outlay sheet distal from where the outlay sheet meets the arced connecting sheet, the clip lip adapted to provide an angled surface, the angled surface forcing the insertion sheet apart from the outlay sheet when pushed against the drip guard.

4. The decoration clip of claim 1, wherein the insertion sheet, the outlay sheet and the arced connecting sheet are one contiguous sheet of material.

5. The decoration clip of claim 1, wherein the insertion sheet, the outlay sheet, the decoration strand holding surface and the arced connecting sheet are one contiguous sheet of material.

6. The decoration clip of claim 1, wherein the one or more strands of decorations is a string of holiday lights and the decoration strand holding surface accepts and holds a wire section of the string of holiday lights.

* * * * *